United States Patent [19]

Paull

[11] Patent Number: 4,928,749
[45] Date of Patent: May 29, 1990

[54] HEAT EXCHANGE RECOVERY METHOD
[75] Inventor: James B. Paull, Andover, Mass.
[73] Assignee: Industrial Energy Corporation, Andover, Mass.
[21] Appl. No.: 912,991
[22] Filed: Sep. 29, 1986

Related U.S. Application Data

[63] Continuation-in-part of Ser. No. 731,525, May 8, 1985, abandoned.

[51] Int. Cl.$^5$ .............................................. F23F 19/00
[52] U.S. Cl. ........................................ 165/1; 165/111; 165/119
[58] Field of Search .................... 165/1, 119, 145, 901, 165/909, 111, 113, 913, 921; 34/86

[56] References Cited

U.S. PATENT DOCUMENTS

| | | | |
|---|---|---|---|
| 2,838,287 | 6/1958 | Kuhner | 165/921 |
| 3,194,214 | 7/1965 | Frendberg | 165/145 |
| 3,231,015 | 1/1966 | Koch | 165/145 |
| 3,294,160 | 12/1966 | Siegfried et al. | 165/145 |
| 3,556,207 | 1/1971 | Piaskowski | 165/145 |
| 3,813,039 | 5/1974 | Wells | 165/901 |
| 3,944,136 | 3/1976 | Huie | 165/901 |
| 4,103,735 | 8/1978 | Warner | 165/901 |
| 4,286,528 | 9/1981 | Willard | 165/901 |
| 4,295,519 | 10/1981 | Bellaff | 165/119 |
| 4,449,569 | 5/1984 | Lisi et al. | 165/40 |
| 4,503,902 | 3/1985 | Zolik | 165/901 |
| 4,557,202 | 12/1985 | Warner | 165/145 |
| 4,621,686 | 11/1986 | Ahn | 165/111 |

Primary Examiner—John Ford
Attorney, Agent, or Firm—Carl G. Ries

[57] ABSTRACT

A heat recovery method for at least partially cooling and at least partially cleaning an exhaust stream of hot air from a heating operation which is contaminated with vaporized, condensable liquids and with finely divided particulate solids comprising (a) a first indirect heat exchange means for partially cooling the hot exhaust stream with a fresh stream of cold air to a temperature not significantly below the dew point of vaporized liquids entrained in the hot air stream and for partially heating the fresh stream of air, (b) solids collecting means for centrifugally separating a substantial portion of the finely divided solids from the partially cooled exhaust stream and (c) second indirect heat exchange means for further cooling the exhaust stream to a temperature below the dew point of vaporized liquids initially contained therein to thereby liquefy a significant portion of the vaporized liquids and to further heat the stream of fresh air.

5 Claims, 1 Drawing Sheet

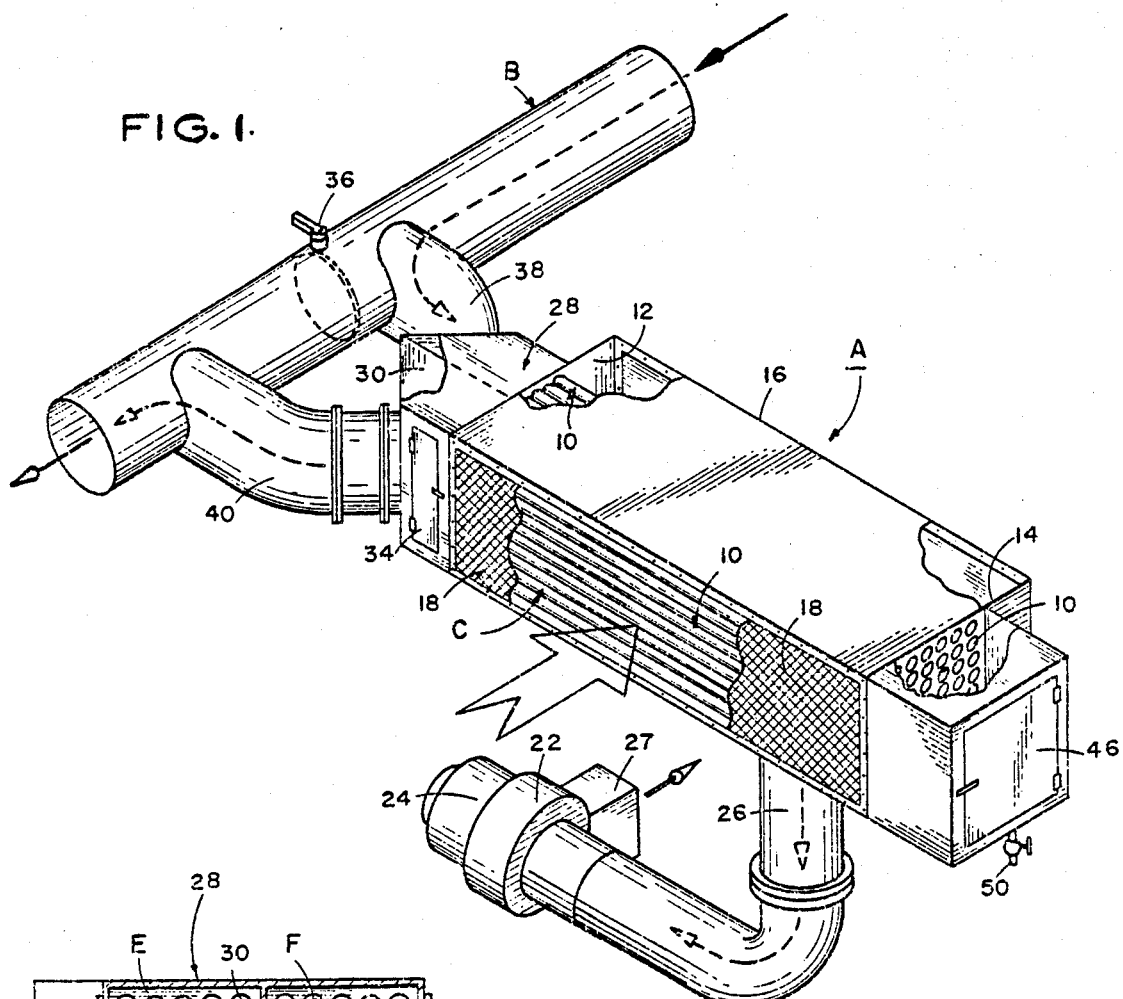
FIG. 1.
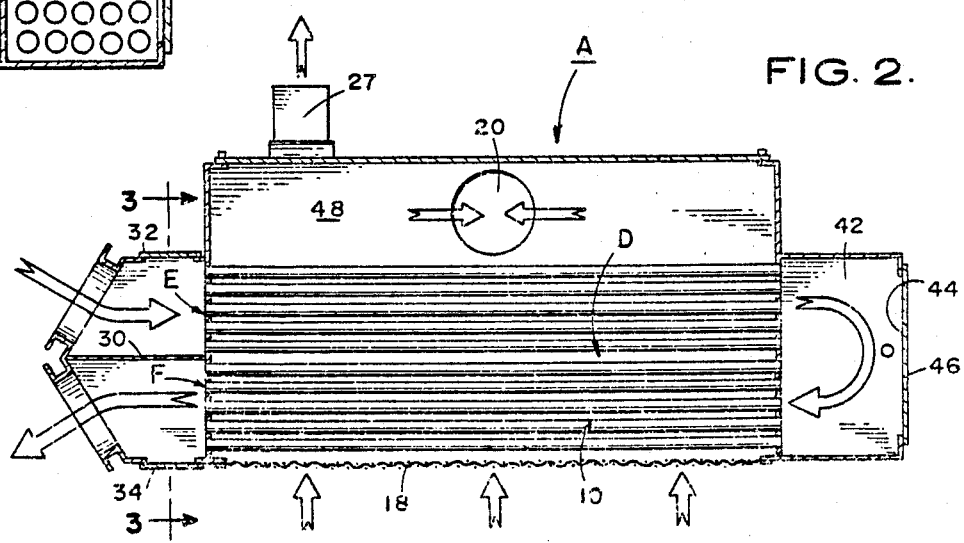
FIG. 3.
FIG. 2.

HEAT EXCHANGE RECOVERY METHOD

RELATED APPLICATION

This application is a continuation-in-part of copending Paull patent application Ser. No. 06/731,525, filed May 8, 1985 and entitled "HEAT RECOVERY SYSTEM" now abandoned.

TECHNICAL FIELD OF THE INVENTION

This invention relates to a method and system for recovering a portion of the heat normally lost when hot air from a manufacturing operation is vented. More particularly, this invention relates to a heat recovery system for at least partially cooling and at least partially cleaning an exhaust stream of hot air from a heating operation which is contaminated with vaporized, condensable liquids and with finely divided particulate solids. In accordance with a preferred embodiment of the present invention, (a) a first indirect heat exchange means is provided for partially cooling the hot exhaust stream with a fresh stream of cold air no lower than a temperature within about 5° F. of the dew point of vaporized liquids entrained therein and for partially heating the fresh stream of air, (b) solids collecting means are provided for centrifugally separating a substantial portion of the finely divided solids from the thus partially cooled exhaust stream and (c) second indirect heat exchange means is provided for further cooling the exhaust stream to a temperature below the dew point of vaporized liquids initially contained therein to thereby liquefy a significant portion of the vaporized liquids and to further heat the stream of fresh air. Suitable means, such as a variable speed air fan are provided to blow air sequentially over the second and first indirect heat exchange means at a flow, relative to the temperature, and flow of the exhaust stream of hot air through the first and second indirect heat exchangers, which is sufficient to achieve the desired degree of cooling in the first and second heat exchangers. In the process, the fresh air is heated for subsequent use (e.g. as air feed for a dryer or a kiln) as it cools the exhaust gas, thus recovering a portion of the heat that would normally be lost by venting of the exhaust stream.

In accordance with the preferred method of the present invention, hot exhaust gas is diverted away from an exhaust duct through first lateral indirect heat exchange means, next, centrifugally flowed through a transfer chamber and then returned to the exhaust duct through second lateral indirect heat exchange means. Fresh cool air is simultaneously cross-flowed across the first and second indirect heat exchange means at a flow correlated with the flow and temperature of the exhaust gas such that the exhaust gas is partially cooled to a temperature above the dew point of liquids entrained therein in the first heat exchange means, and is further cooled to at least partially liquefy a significant portion of the vaporized liquids in the exhaust gas in the second heat exchange means, whereby the cool fresh air is heated, whereby the finally divided solids in the exhaust gas are selectively centrifugally separated from the exhaust gas in the transfer chamber and whereby the condensed liquids separate from the exhaust gas in the second heat exchange means.

1. DESCRIPTION OF THE PRIOR ART

It has heretofore been proposed to preheat the air flowing to a manufacturing operation by bringing it into indirect heat exchange contact with a stream of hot exhaust air from the operation. The presence of finely divided solids and vaporized liquids in the exhaust air always presents a problem, because such materials tend to settle out during the course of heat exchange thereby impeding flow, or even blocking flow of the air.

In order to overcome this problem, it has been proposed by the prior art to install a filter in the exhaust line upstream from the indirect heat exchange means in order to remove solids. This is shown, for example, in Winstel U.S. Pat. No. 4,028,817; Briscoe U.S. Pat. No. 4,034,482; Taylor U.S. Pat. No. 4,183,433 and Bullock U.S. Pat. Nos. 4,137,645 and 4,204,338. Another relevant patent in this regard is Smith U.S. Pat. No. 4,326,344.

The results obtained with this approach have not been entirely satisfactory because the filter impedes the flow of air and because the build up of solids on the filter surface requires frequent cleaning if the apparatus is to function efficiently.

An alternate approach has been to provide a filter downstream of the heat exchange means or to simply exhaust the gas without lint removal as shown, for example, by Schroeder et al. U.S. Pat. No. 4,868,709; McConnell U.S. Pat. No. 4,063,590 and Parker U.S. Pat. No. 4,095,349.

The latter approach is not entirely satisfactory because liquids can condense out during the passage through the indirect heat exchange means which, together with finely divided solids can impede or block the air flow. Willard U.S. Pat. No. 4,286,528 discloses a filter exhaust system for a wood burning stove including a heat exchange unit defining a vertical flow path for the exhaust gases which is capable of cooling the gases sufficiently to condense any vaporized creosote. The condensed creosote flows from the heat exchange unit by gravity.

In Tallman et al. U.S. Pat. No. 4,515,145 a gas-fired, condensing mode, hot air furnace is disclosed wherein a heat exchanger and a condenser are mounted in the exhaust passage for heating fresh air and for removing water from the products of combustion.

Several embodiments of an exhaust gas treating method are disclosed in Warner U.S. Pat. No. 4,557,202, including an embodiment using two separate heat exchangers, wherein incoming air is heated in a water-condensing mode in the first heat exchanger and further heated in the second heat exchanger.

Briscoe U.S. Pat. No. 4,034,482 is directed to a heating system, including a heat exchanger, wherein exhaust gas from a clothes dryer is introduced into the return air duct of a building heating system and an external bypass connection is provided for the heat exchanger.

2. BACKGROUND OF THE INVENTION

It is common practice in many industries to use driers, ovens, kilns, etc., as part of the manufacturing operation. For example, driers are commonly used in the textile industry for the heat processing of fabrics and are used in the food processing industry for the spray drying of edible materials. As another example, in the pulp and paper industry, it is common practice to employ driers in connection with paper manufacturing machinery. Metal fabrication operations frequently employ a paint drying oven wherein hot air is used to dry the paint and remove solvents. Driers are used for drying pills and powders in the pharmaceutical industry in the calcining of gypsum, cement and ceramics, and in the curing of plastics and chemicals, etc.

In all of these processes there is a significant loss to the manufacturing operation due to the cost of heating air which is ultimately exhausted to the atmosphere.

SUMMARY OF THE INVENTION

The foregoing and related problems are solved in accordance with the present invention through the provision of a heat recovery system that can be interconnected with the exhaust duct from a manufacturing operation. The system of the present invention is of a comparatively simple construction, and with a configuration such that it may be installed with ease with a minimum amount of floor space and/or head space.

In accordance with the present invention, the heat recovery system comprises a first heat exchange means, an intermediate solids collecting means and a second heat exchange means. This is conveniently provided in accordance with the preferred embodiment of the present invention by providing a plurality of elongate heat exchange tubes which are mounted in a generally horizontal (lateral) mode, in parallelism between head plates which are, in turn, secured to a surrounding frame provided with an air inlet and an air outlet to thereby provide a chamber for the indirect heating of a stream of fresh air. In accordance with this arrangement, the frame containing the heat exchange tubes is laterally mounted adjacent a duct through which contaminated hot air flows in a manner such that the axis of the heat exchange tubes is transverse to the direction of flow of hot air through the duct. A partitioned transfer chamber is mounted to the duct-facing end plate of the heat exchange tubes to channel the flow of hot exhaust air into some of the tubes (inlet tubes) of the heat exchanger to provide a first indirect heat exchange means and to channel the flow of partially cooled exhaust air in a manner to be described through the remaining tubes (outlet tubes) and back to the duct, to thereby provide a second indirect heat exchange means.

A transfer chamber is mounted to the obverse end plate of the heat exchange bundle so that air flowing through the inlet heat exchange tubes is caused to reverse direction and flow back through the outlet heat exchange tubes and to the discharge portion of the transfer chamber Any suitable means, such as, for example, branch ducts, is provided for channeling hot exhaust air to the inlet side of the transfer chamber and for channeling cooled exhaust air from the outlet side of the transfer chamber back to the hot air duct. With this construction, appropriate means are provided, such as, for example, a bypass damper, for channeling the flow of exhaust air to the inlet side of the transfer chamber and for channeling the flow of cooled exhaust back to the duct.

Appropriate means, such as an air fan, or blower, powered by a variable speed motor are provided for drawing (inducting) cold air into the heat exchange space defined by the frame, across the heat exchange tubes and out, through the fan to a return line, suitably leading to a manufacturing operation.

Appropriate means, such as a drain are provided for removing condensed liquids from the second heat exchange means.

BRIEF DESCRIPTION OF THE DRAWINGS

In the drawings:

FIG. 1 is a perspective view, with parts broken away, showing a preferred embodiment of the present invention;

FIG. 2 is a top view, with the top of the frame removed, showing the interior of the heat recovery system; and FIG. 3 is a cross-sectional view taken along the line 3—3 of FIG. 2 showing the construction of the transfer chamber.

DESCRIPTION OF THE PREFERRED EMBODIMENT

Turning now to the drawings, and especially to FIG. 1, there is shown a heat recovery device A of the present invention operatively connected to a duct B leading from a heating operation (not shown) which contains hot contaminated exhaust air to be discharged from the system.

As shown in FIG. 1, and also in FIGS. 2 and 3, a plurality of heat exchange tubes 10 are mounted in and supported by a duct side end plate 12 and an obverse end plate 14. The heat exchange tubes 10 are preferably, but not necessarily, o f uniform size and of a diameter such that turbulent air flow is encouraged in order to inhibit the settling of finely divided solids inside the tubes and to enhance the film heat transfer coefficient. In a typical industrial situation, the stream of hot air flowing through the duct B may be at a temperature of about 200° to about 600° F. and have a velocity of from about 1000 to about 3000 cubic feet per minute. In such a situation, tube diameters may range from about 1 to about 3 inches, although larger or smaller diameter tubes may be used, if desired. The number of tubes in the tube bundle should be adequate to handle the amount of air flowing through the duct B without an excessive loss of pressure. Typically, a tube bundle will contain from about 100 to about 200 tubes. In a specific example of the preferred embodiment, tubes are two inches in diameter and six feet long. A total of 156 tubes are used in tube sections E and F, yielding a heat transfer surface area of approximately 500 square feet.

The tube bundle, designated generally by the letter C is encased in a frame 16 of any suitable construction in order to define a shell side heat exchange space designated generally by the letter D. The frame 16 is provided with an inlet opening such as a screened side opening 18 on the discharge side of the frame and an outlet, such as an outlet port 20 (FIG. 2) on the upstream side of the tube bundle C. With this construction, fresh air can flow into the heat exchange space through the screened side opening 18, across the heat exchange tubes 10 in the heat exchange space D and out of the frame through the discharge port 20. A positive flow of air across the heat exchange tubes can be provided in any suitable manner such as, for example, through the provision of an air fan or blower 22 controlled by a variable speed motor 24 interconnected with the outlet port 20 by means of a suction side duct 26. The fan 22 is provided with a discharge duct 27 for delivering the heated fresh air to a desired point in a manufacturing operation wherein hot air is employed (e.g., a dryer or a kiln).

The frame 16 is supported either from the ceiling or the floor of a building in which it is located by any suitable means (not shown) and disposed so that the longitudinal axis of the heat exchange tubes 10 are laterally transverse of the axis of flow of hot air through the duct B. Frame 16 is preferably mounted at a slight lateral angle from the horizontal, sloping downwardly from duct B, such as an angle of about 5° or more, so that condensed liquids will flow more easily toward the drain 50 for removal from the heat recovery device A.

A transfer chamber 28 is provided for covering the duct side end plate 12. The transfer chamber is also provided with a partition or wall 30 dividing the tube bundle into a set of inlet tubes E (first indirect heat exchange means) and a set of outlet tubes F. (second indirect heat exchange means). Preferably, the partition is arranged so that an equal number of heat exchange tubes are in the incoming section and the outgoing section. However, this is not absolutely necessary and, if desired, the number of tubes in the incoming section can be different from the number of tubes in the outlet section. Access doors 32 and 34 are provided in each of the inlet sections and outlet sections for cleaning and maintenance.

Suitable bypass means such as damper 36 are installed in duct B. An inlet duct 38 is provided interconnecting hot air duct B with the inlet side of the transfer chamber 28 and an outlet duct 40 is provided downstream of the bypass damper 36 for interconnecting the outlet side of the chamber 28 with the duct B.

An obverse collection chamber 42 is provided which covers the obverse end plate 14 so that incoming air flowing through the heat exchange tubes 10 in the inlet section will reverse direction therein and flow through the heat exchange tubes 10 in the outlet section in a return path.

In accordance with the present invention, an important function is performed in the collection chamber 42. Air flowing into the chamber 42 must make a 180° turn in order to flow into the outlet tubes. The centrifugal effect of the reversing air flow causes substantially all of the finely divided particulate solids to be thrown from the flowing air against the back wall 44 of the collection chamber. This reversal of the direction of air flow is significant because it substantially removes solid particulates from the air stream so that there is no significant flow of particulates to outlet tubes F where further heat exchange reduces the temperature to below the dew point of the liquids in the air stream, thereby condensing the liquids so that the condensed liquids can be removed through the drain 50. This two stage heat recovery method (solids removal followed by liquids removal) substantially prevents the mixing together of separated particulates and condensed liquids. The mixing together of separated particulates and condensed liquids tends to result in the creation of a thick, viscous material which impedes air flow and can even block the tubes.

Therefore the back wall 44 is provided with a trap door 46 to permit periodic removal of finely divided solids from the obverse chamber 42.

The frame 16 also defines a discharge chamber or outlet box 48 and the frame 16 is preferably mounted so that the obverse end is at a slightly lower elevation than the duct side end. This permits liquids condensed in the tube section F by the cooling action of the incoming fresh air on the out flowing hot air to collect and run to a drain 50 for discharge from the system.

OPERATION OF PREFERRED EMBODIMENT

As an example of the operation of the preferred embodiment of the present invention, a stream of hot air contaminated with vaporized liquids such as water vapor, hydrocarbon solvents, greases, etc., flows through the duct B with the damper 36 open at a flow of about 1000 to about 5000 feet per minute, such as a flow of 3000 standard cubic feet per minute. In order to practice the present invention, the by pass damper 36 is closed in order to divert the hot contaminated air through the inlet duct 38 to the transfer chamber 28 and thence through the heat recovery device A of the present invention and back to the duct B through the outlet duct 40. The variable speed motor 24 is actuated to drive the air compressor fan at a rate such that fresh air is drawn through the screen side opening 18 at a mass flow equal to about 30 to 300% of the mass flow of the hot exhaust gas flowing through the duct B and, more preferably, at a mass flow of about 60 to 90% of the mass flow through the duct B. The hot, dirty air will be diverted, by closing of the damper 36 into the inlet duct 30 and from thence to the inlet side E of the chamber 28 and from thence through the heat exchange tubes in the incoming section E to the obverse chamber 44 where the direction of flow will be reversed causing the air to return by way of the heat exchanger tubes in the outlet section F and thence, by way of the duct 40 back to the main exhaust duct B.

At the same time fresh air at ambient temperature will be drawn across the heat exchange tube of the heat exchange bundle with a cross flow pattern. The fresh air will be at its lowest temperature when it first passes across the shell side of the heat exchange tubes in the outlet section F and will be further heated as it flows across the heat exchange tubes in the inlet section E. The thus heated air will be withdrawn through the outlet 20 and the duct 26 through the fan 22 and thence to the outlet 27 from the discharge side of the air fan 22.

As the incoming hot, dirty air passes through the tube side of the heat exchange tubes 10 in the incoming section, it is partly cooled by the cross flow of air, the cooling being such that the hot air is cooled to a temperature which is preferably above and within 5° F. of the dew point of the vaporized liquids contained therein. This is important in order to eliminate the formation of condensate in the heat exchange tubes in the incoming section E. After flow through the heat exchange tubes 10 in the incoming section E, the hot, partially cooled air enters the obverse chamber 42 where it reverses direction for flow through the heat exchange tubes in the outlet section F. As a consequence, the particulate solids are separated from the air stream by centrifugal action and thrown against the rear wall 42 of the obverse chamber 42 for periodic collection and removal through the door 46. At this point in the cooling process, most, and preferably all, of the vaporized liquids will still be in vapor form. If there is significant liquefication of the vaporized liquids prior to this point, the liquids will combine together with the finely divided solids resulting in a sticky, difficult to manage mass of material which accumulates on the walls of the inlet tubes E.

The partially cooled air from the chamber 42 is further cooled on passage through the heat exchange tubes E in the outlet section F reaching an appropriate exhaust temperature as it enters the outlet side of the transfer chamber 28.

As a specific example, if the hot, dirty air entering the duct 38 at 2500 standard cubic feet per minute at a temperature of about 250° F., and if the fresh air coming in through the screen side opening 18 at a temperature of about 70° F., has approximately the same mass flow as the dirty air, then the final temperature of the heated fresh air and of the cooled hot air will be about 170° F. This will result in a recovery of about 44% of the heat from the hot, dirty air flowing into the duct 38. Periodic visual inspection of the inside of the tubes E by the operator will permit him to determine whether or not the selected predetermined flow of the incoming fresh air is adequate. Thus, for instance, if liquids are being condensed in the inlet tubes E, the liquids will collect with the solids in the collection chamber 42, this will indicate that the rate of flow of the fresh air is excessive. The operator would reduce the flow by appropriate adjustment of the variable speed motor 24. As another instance, if the liquids are not condensing in the outlet tubes F, this will indicate that further cooling of the exhaust air is desirable. The operator in this instance would increase the rate of air flow by adjustment of the variable speed motor 24 so as to increase the air flow. However, the rate of flow of the fresh air should not be increased to an extent such that liquids will again begin to condense in the inlet tubes E.

Thus, there is no need for an expensive control system for regulating air flow with the apparatus and method of the present invention, although a control system (not shown) could be used, if desired.

The extent to which the incoming fresh air is heated will be dependent upon the ultimate function for which it is to be used. If the heated fresh air is to be used as a source of incoming air for a dryer, it will be desirable to maximize the temperature of the fresh air whereas, as another example, if the fresh air is to be used for heating a confined air space such as a work room, a minimal increase in temperature will be desirable. Therefore, the flow of the incoming fresh air relative to the flow of the hot air in the exhaust duct B may be varied within wide limits, such that the fresh air flow is from about 30% to about 300% of the hot air flow, depending, as indicated, upon the degree of heating required. Within these broad flow rates, and also depending upon the temperature of the air in the exhaust duct B, an absolute temperature increase of from about 25° F. to about 200° F. can be obtained by passage of the fresh air across the heat exchange tubes 10. Usually, the flow of fresh air across the heat exchange tubes 10 will be from about 80% to about 150% of the flow of the air through the duct B.

As will be apparent from the foregoing description of a preferred embodiment of the method and apparatus of the present invention, an advantage of the present invention is the sequential removal, from the exhaust hot air stream, first of particulate solids and second of condensed liquids. The normal tendency of vaporized liquids to condense prior to or during the removal of particulate solids is complicated by the normal presence in the exhaust gas of vaporized water and oils that condense at different temperatures. This problem is resolved in accordance with the present invention by not cooling the exhaust stream of hot air in the heat exchange tubes E to a temperature that is lower than a temperature within about 5° F. of the dew point of the vaporized liquids.

As pointed out above, the final temperature of the exhaust gas as it is returned to the duct B from the outlet heat exchange tubes F through outlet duct 40 will be determined by the use to which the air discharged from port 27 is to be put (e.g. as the source of air for a dryer or the heater for a work room). This, in turn, will determine the temperature to which the exhaust air is to be cooled during its passage through the inlet heat exchange tubes E. In general, from about 40% to about 60% of the cooling should be done in inlet heat exchange tubes E, provided, however, that the exhaust gas should not be cooled below a temperature within about 5° F. of the dew point of the vaporized liquids in the exhaust gas. This does not present a problem because the operator can visually inspect the inside of the inlet heat exchange tubes E and the outlet heat exchange tubes F by looking through opened trap door 46. The operator can then take the appropriate corrective action if condensate is undesirably forming in inlet heat exchange tubes E or undesirably failing to form in outlet tubes F.

Having thus described my invention, what is claimed is:

1. A method for cooling and purifying an exhaust stream of hot air flowing through a lateral duct and for at least partially heating fresh air, said exhaust stream being contaminated with finely divided solids and vaporized liquids said method comprising the steps of:
   laterally diverting said exhaust stream away from said duct through first lateral indirect heat exchange means, comprising lateral heat exchange tubes next laterally centrifugally flowing said exhaust stream through a transfer chamber and then laterally returning said exhaust stream to said duct through second lateral indirect heat exchange means comprising lateral heat exchange tubes,
   simultaneously laterally cross-flowing fresh air across said first and second indirect heat exchange means in indirect heat exchange contact with said exhaust stream,
   setting the rate of flow of said fresh air to provide a fresh air flow sufficient to cool said exhaust stream in said first indirect heat exchange means to a temperature not lower than a temperature within 5° F. above the dew point of said vaporized liquids and to cool said exhaust stream in said second indirect heat exchange means to a temperature below the dew point of said vaporized liquids sufficiently to at least partially liquefy said vaporized liquids,
   a. separating and collecting said finely divided solids in said transfer chamber for discharge therefrom,
   b. collecting said liquefied vaporized liquids condensed within said second indirect heat exchange means in said transfer chamber for discharge therefrom, and
   c. collecting heated fresh air from said first and second indirect heat exchange means for discharge to a heating operation.

2. A method as in claim 1 wherein said exhaust stream is flowed into said duct at a temperature of about 200° to about 600° F. at a flow of about 1,000 to about 3,000 cubic feet per minute, and wherein the fresh air is cross-flowed across said first and second indirect heat exchange means at an initial temperature of about 50° to about 100° F. and at about 30% to about 300% of the flow of said exhaust stream such that said exhaust stream is returned to said duct from said second indirect heat exchange means at a temperature of about 110° to about 300° F. and wherein from about 40% to about 60% of the total cooling is accomplished in said first lateral heat exchange means.

3. A method as in claim 2 wherein said exhaust stream is flowed into said duct at a temperature of about 250° to about 350° F. at a flow of about 1,400 to about 2,100 cubic feet per minute, and wherein the fresh air is cross-flowed across said first and second indirect heat exchange means at an initial temperature of about 50° to about 100° F. and at about 30% to about 300% of the flow of said exhaust stream such that said exhaust stream is returned to said duct from said second indirect heat exchange means at a temperature of about 150° to about 200° F. and wherein from about 40% to about 60% of the total cooling is accomplished in said first lateral heat exchange means.

4. A method for cooling and purifying a stream of hot exhaust gas flowing through a lateral duct and contaminated with finely divided solids and vaporized liquids emanating from a heating unit and for at least partially heating fresh air, said method comprising the steps of:

bringing said hot exhaust gas into lateral indirect heat exchange contact with partially heated fresh air in a first indirect laterally tubed heat exchange zone in order to further heat said partially heated fresh air and in order to cool said hot exhaust gas to a temperature not lower than a temperature within about 5° F. above the dew point of vaporized liquids contained threin;

then laterally centrifugally separating finely divided solid particles from said hot exhaust gas in a lateral transfer zone;

then bringing said partially cooled exhaust gas into lateral indirect heat exchange contact with incoming fresh air in a second indirect laterally tubed heat exchange zone to partially heat the same to provide the partially heated fresh air for said first indirect heat exchange zone and in order to cool said hot exhaust gas below the dew point of said vaporized liquids contained therein in order to at least partially liquefy the same;

collecting and removing condensed liquids from said second zone;

collecting separated finely divided solid particles in said transfer zone for removal therefrom;

returning the cooled hot exhaust gas to said duct; and collecting heated fresh air from said first and second indirect heat exchange zones.

5. A method for cooling an exhaust stream of hot gas contaminated with vaporized, condensable liquids and finely divided particulate solids emanating from a heating operation and flowing through a lateral elongate duct and for heating a stream of fresh cooler air which comprises:

a. laterally flowing said exhaust stream through a first indirect laterally tubed heat exchange means, centrifugally reversing the direction of flow of said exhaust stream in a transfer chamber and then laterally flowing said exhaust stream back to said duct through a second laterally tubed heat exchange means, b. simultaneously laterally cross-flowing said stream of cooler fresh air across said first and second indirect heat indirect heat exchange means in indirect heat-exchange contact with said exhaust stream, c. setting the flow of said fresh air across said first and second indirect heat exchange means, relative to the flow and temperature of said exhaust stream flowing through said first and second heat exchange means to provide a flow for said fresh air stream sufficient to cool said exhaust stream in said first indirect heat exchange zone to a temperature not lower than a temperature within 5° F. above the dew point of said vaporized liquids therein and sufficient to cool said exhaust stream in said second indirect heat exchange means to a temperature below the dew point of said vaporized liquids, d. separating and collecting said finely divided solids in said transfer chamber for discharge therefrom, e. collecting said liquefied vaporized liquids condensed within said second indirect heat exchange means for discharge therefrom, and f. collecting heated fresh air from said first and second indirect heat exchange means for discharge to a heating operation.

* * * * *